April 29, 1924.
W. L. HARROUN
CAN FILLER
Filed April 13, 1923
1,492,323
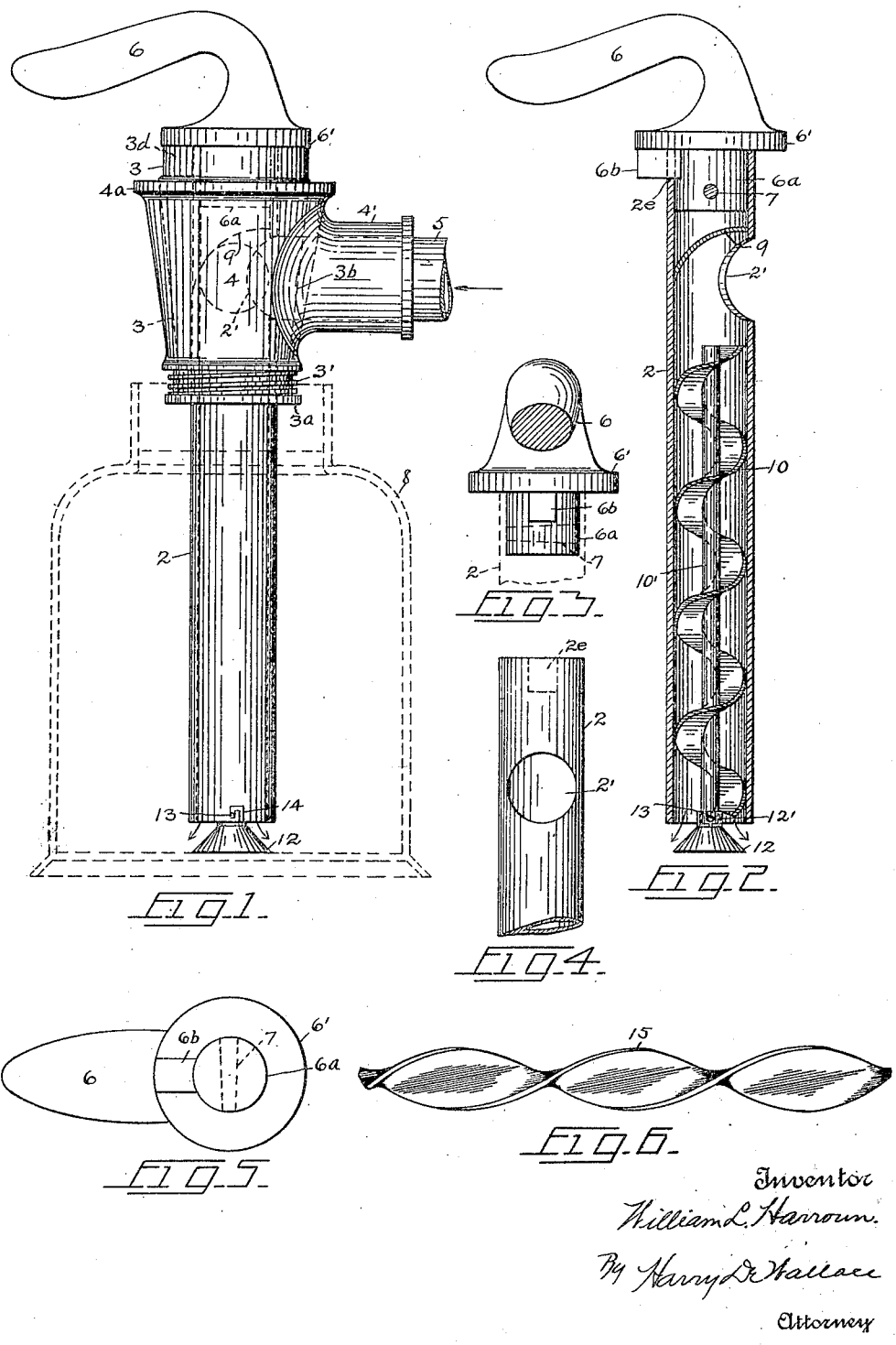

Patented Apr. 29, 1924.

1,492,323

UNITED STATES PATENT OFFICE.

WILLIAM L. HARROUN, OF ELLISBURG, NEW YORK.

CAN FILLER.

Application filed April 13, 1923. Serial No. 631,848.

*To all whom it may concern:*

Be it known that I, WILLIAM L. HARROUN, a citizen of the United States, residing at Ellisburg, in the county of Jefferson and State of New York, have invented certain new and useful Improvements in Can Fillers, of which the following is a specification.

This invention relates to improvements in can fillers, designed for use by creameries, dairies and milk shippers generally, and has for its object to provide effectual means for eliminating the foam which interferes with the proper filling of the cans.

Milk delivered to the shippers in small quantities is usually placed in large tanks or vats, from which it is drawn off into the ordinary shipping cans, by means of "can fillers." As a rule, each of these filling devices consists of a relatively long tube (about 26 inches), which is supported by a head that usually connects directly with the mixing vat. The filling tube is inserted downwardly in a can, and has a rigid handle, by which it is rotated like a valve, for controlling the flow of the milk towards the bottom of the can. These older filling tubes are generally unobstructed throughout, and the milk falling so great a distance strikes the bottom of the can with sufficient force to create a large body of foam. When the foam covered milk rises to the top of the can, the operator shuts off the flow of the milk from the vat, withdraws the filling tube from the can, skims off the foam, and finally refills the can by hand. This latter operation usually consumes from three to four minutes time, which not only delays the shipping, but also greatly increases the cost of the filling work. The foam must be removed from the cans, otherwise, when the latter reach their destination, there will be a shortage of the liquid contents amounting to from 10% to 25%, which is usually accounted for by dockage in a well-known manner.

The present invention has for its particular object to provide novel and effectual means for preventing the foaming of the milk during the filling operations, as well the loss of time heretofore occasioned by the skimming and refilling of the cans. To this end, I provide a stationary spirally-shaped core, which is arranged to be removably inserted in the filling tube, and by means of which the milk flows the full length of the tube in a smooth spiral path, which effectually prevents agitation, and the consequent foaming of the milk, during the filling operations. A further object is to provide novel means for detachably locking and holding the spiral member in the tube. A further object is to provide a detachable handle, which is arranged to be interlocked with the filling tube, and may be readily and quickly removed for the purpose of cleansing the parts. And a further object is to provide simple means for spreading the stream of milk immediately after it leaves the lower end of the spiral member.

I attain these objects by the means set forth in the detailed description which follows, and as illustrated by the accompanying drawing, in which—

Figure 1 is a side elevation of the complete device. Fig. 2 is a central vertical section through the filling tube, showing the spiral member and spreader. Fig. 3 is a broken elevational view of the handle of the tube. Fig. 4 is a broken view of the filling tube. Fig. 5 is a bottom face view of the handle. And Fig. 6 is a fragmentary view of a modified spiral member.

In the drawing, 2 represents the can-filling tube, which telescopically and detachably fits a bushing 3, the latter being disposed and resiliently held in a vertical bore of a T-head 4, by means of a spring 3', both the bushing and the spring being held in place and at the desired tension, by an annular nut 3ª. The hollow integral branch 4' of the T is usually connected directly with the mixing and storage vat (not shown), by a pipe 5. The bore of the branch 4' is arranged to register with an inlet opening 2' of the tube 2, and with a corresponding opening 3ᵇ of the bushing, for the free passage of the milk into the tube, when the latter is in the position shown in Figs. 1 and 2. The head 4 is provided with a flange 4ª, above which projects the open top end of the bushing, which is provided with a radial socket or notch, at 3ᵈ, (see Fig. 1). The tube 2 is rotatable in the bushing 3 for moving the port 2' into and out of registry with the port 3ᵇ, and both the tube and the bushing are rotatable as one part for alining the ports 2'—3ᵇ with the branch 4', for starting and stopping the filling operations. The tube 2 is manipulated by means of a handle 6, which is preferably an integral part of a flange body 6', the said body having a depending cylindrical portion 6ª, which preferably snugly fits the top end of the tube 2, and may be held in place by a tapering-pin 7, which may be driven through alining perforations in said parts, and by means of which the handle and tube may be readily and quickly separated for cleansing the parts. The body 6' is provided with an integral radial tooth or lug 6ᵇ, which seats in a notch 2ᵉ formed in the top end of the tube 2. The tooth 6ᵇ is arranged to engage the corresponding socket 3ᵈ of the bushing, for indicating that the ports 2'—3ᵇ are in registry, and for holding the parts in that position during the filling of the can, as 8. To close the valve 2, for stopping the flow of the milk towards the can, the operator simply rotates the tube 2 and bushing 3 in either direction until the ports 2'—3ᵇ are moved out of registry with the bore of the branch 4'. 9 represents a guard which is disposed in the top of the tube 2 above the port 2', for preventing milk or other matter from reaching and fouling the top of the tube.

The means for preventing the foaming of the milk in the can 8, consists of a spirally-shaped core or member 10, which is arranged to detachably fit the bore of the tube 2, and preferably extends from the bottom of the tube to within an inch or two of the port 2'. This spiral member is preferably mounted on a core or rod 10', and provides a continuous spiral path, by which the milk is conducted from the port 2' to the bottom of the can. By this construction and arrangement, the stream of milk, instead of falling the full depth of the tube 2, is caused to flow or glide quietly and steadily down this spiral course with the least possible agitation, until it reaches the lower end of the tube, at which point the liquid encounters a cone-shaped part 12, which tends to spread the liquid in every direction over the bottom of the can 8. By providing this spreader 12, the milk flows into the can very gently and with very little agitation. The top-end of the cone comprises a short sleeve 12', which preferably snugly telescopes the lower end of the rod 10'. The spiral core 10 is preferably detachably held in the tube 2, by a pin 13, which passes through the rod 10', and its free ends are received by similar inverted L-shaped slots 14, which are formed in the opposite lower sides of the tube 2; one of said slots being shown in Fig. 1.

In Fig. 6 is shown a modified and somewhat less expensive form of spiral core, which is made by consistently twisting a plain strip 15 of copper or aluminum, for providing a sufficient number of convolutions, to prevent the agitation and consequent foaming of the milk, while the latter descends through the filling tube.

In practice, at the end of the filling operation, the tube 2 and the bushing 3 are rotated for shutting off the milk from the vat, and the tube 2 is then withdrawn from the can and head 4, to allow the filled can to be replaced by an empty one.

My improvements is extremely simple, and may be constructed and installed at slight expense. The provision of the spiral core 10, herein shown and described, enables me to completely fill the can 8 at one operation, thereby saving from three to four minutes, which formerly were consumed by skimming off the foam and refilling the cans by hand, as explained.

Having thus described my invention, what I claim, is—

1. A T-body adapted to receive liquid from a vat, a movable filling tube having a liquid port supported by said body, a spirally shaped member in said tube for preventing the agitation of the liquid flowing downwardly from said port, and means for spreading the liquid after it leaves the said member.

2. A can filler including a T-body adapted to receive liquid from a vat, a removable filling tube adjustably disposed in said body and having a liquid receiving port adapted to be shifted for shutting off the flow of liquid from the vat towards a can, a foam preventing member comprising a removable spiral core extending from said port to the bottom of the tube, and a cone-shaped spreader located below said core.

3. A can filler including a T-body adapted to receive milk from a vat, a tube having a removable head supported by said body and having a liquid receiving port near its top, and a normally stationary spirally-shaped member in said tube for preventing the foaming of the liquid in its descent from said port towards the bottom of a can, said member being removable for cleansing the parts.

4. In a can filler, the combination with a T-body and a bushing in said body, of a filling pipe telescoping with said bushing, means for interlocking said pipe and said bushing for operation as one part, and a spiral core detachably disposed in said pipe below said bushing.

5. In a can filler, the combination with a T-body adapted to receive liquid from a vat, of a filling tube adapted to be inserted in a can, said tube having a liquid receiving port near its top end and being rotatable for stopping the flow of the liquid through said port, and a member disposed concentrically in said tube by which the liquid flows without agitation from said port towards the bottom of the can.

In testimony whereof I affix my signature.

WILLIAM L. HARROUN.